(12) United States Patent
Stringam et al.

(10) Patent No.: US 6,907,779 B1
(45) Date of Patent: Jun. 21, 2005

(54) CONTINUOUS FLOW MEASUREMENT RECORDER AND RECORDING METHOD

(75) Inventors: Blair Lewis Stringam, Littleton, CO (US); Kathleen H. Frizell, Arvada, CO (US); Brent W. Mefford, Lakewood, CO (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/640,710

(22) Filed: Aug. 18, 2000

(51) Int. Cl.[7] .............................................. G01F 1/20
(52) U.S. Cl. ...................................................... 73/215
(58) Field of Search .............................. 73/215, 866.5, 73/204.27; 324/642

(56) References Cited

U.S. PATENT DOCUMENTS

| | | | | |
|---|---|---|---|---|
| 3,719,081 A | * | 3/1973 | Lynn et al. .................... 73/215 |
| 3,866,028 A | * | 2/1975 | Schontzler et al. ........... 73/215 |
| 3,996,798 A | * | 12/1976 | Vander Heyden ............ 73/195 |
| 4,221,004 A | * | 9/1980 | Combs et al. ............... 367/114 |
| 4,480,466 A | * | 11/1984 | Gates ........................... 73/195 |
| 4,523,460 A | * | 6/1985 | Strickler et al. .............. 73/200 |
| 5,024,084 A | * | 6/1991 | Frawley, Jr. .................. 73/215 |
| 5,333,498 A | * | 8/1994 | Bracket et al. ........... 73/304 R |
| 5,437,634 A | * | 8/1995 | Amano ......................... 604/65 |
| 5,442,343 A | * | 8/1995 | Cato et al. ............. 340/825.35 |
| 5,633,809 A | * | 5/1997 | Wissenbach et al. ......... 702/45 |
| 5,726,358 A | * | 3/1998 | Kolling ........................ 73/215 |
| 5,737,963 A | * | 4/1998 | Eckert et al. ................. 73/290 |
| 5,926,438 A | * | 7/1999 | Saito ........................... 367/111 |
| 6,414,242 B2 | * | 7/2002 | Schmidt .................... 73/866.5 |
| 6,427,718 B1 | * | 8/2002 | Stringam et al. ........... 137/392 |

* cited by examiner

*Primary Examiner*—Harshad Patel
(74) *Attorney, Agent, or Firm*—Stites & Harbison PLLC; Ross F. Hunt, Jr.

(57) ABSTRACT

A continuous flow measurement recorder is provided for making water flow measurements in an open channel. An ultrasonic sensor obtains pressure head measurements upstream from a flume or weir located in the open channel. A central processing unit receives the head measurements from the sensor and calculates the water flow rate and the total flow. A liquid crystal display device displays the water flow rate and the total water flow calculated by a central processing unit. A common, portable, easy to install housing is used to house and protect the sensor, central processing unit, and display device.

8 Claims, 2 Drawing Sheets

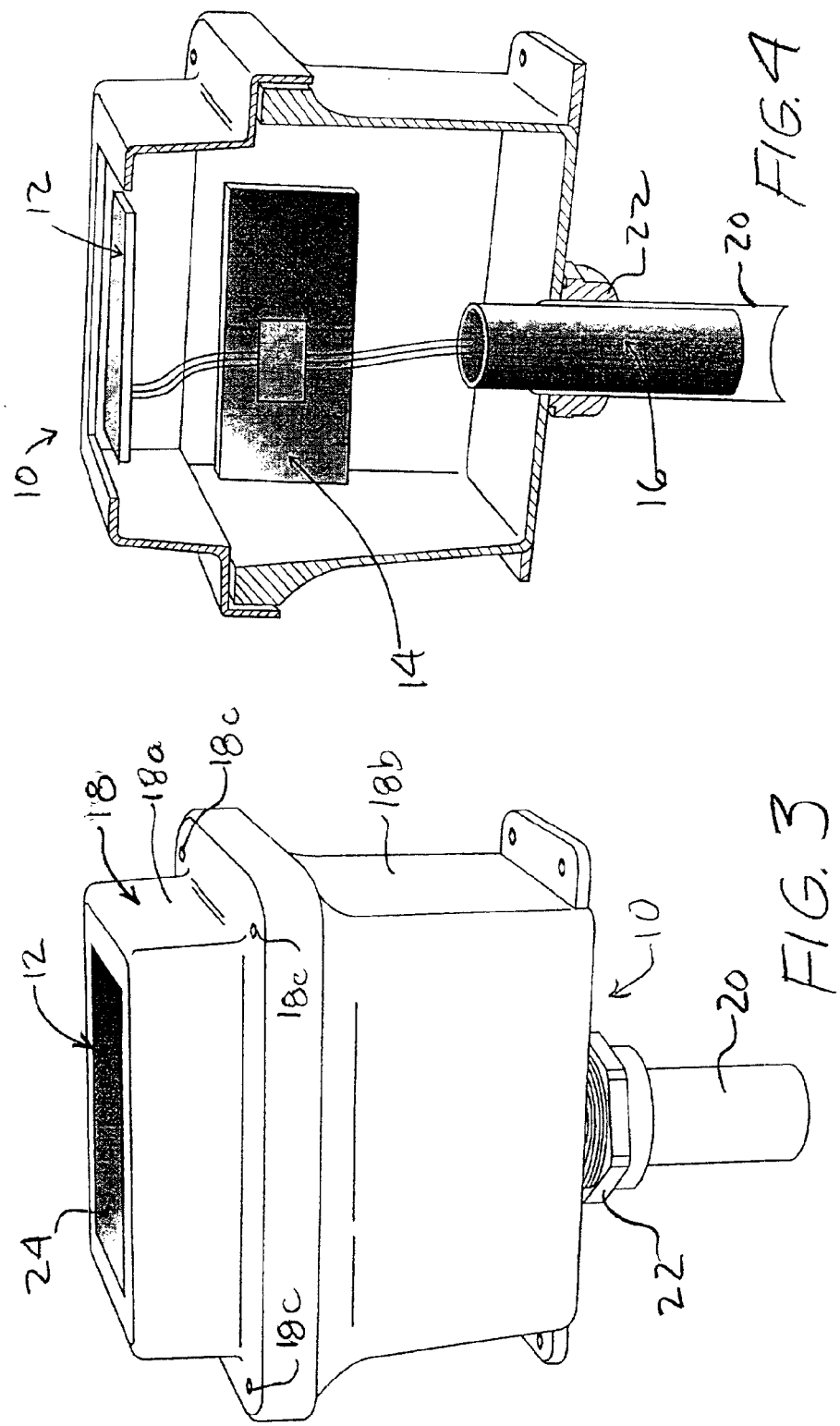

CONTINUOUS FLOW MEASUREMENT RECORDER AND RECORDING METHOD

FIELD OF THE INVENTION

The present invention relates to a method and system for measuring and recording the flow rate of water in an open channel. More particularly, the present invention relates to a compact, readily transportable, continuous flow measurement recorder for a flume or weir or the like and to a corresponding recording method.

BACKGROUND OF THE INVENTION

Historically, flow measurement through flumes or over weirs has been accomplished by carrying out manual measurements using a staff gauge. These manual measurements required management personnel or farmers to read water levels and look up the corresponding flow rate from a table. These manual measurements cannot be taken on a continuous basis, and this creates inaccuracies in the estimation of water flow. In addition, events, such as the change of water levels between manual measurements creates inaccuracies in the measurement. These inaccuracies result in the delivery of too much or too little flow volume in irrigation related applications.

Chart recorders, such as the Stevens Recorder, have also been used in the past. The chart recorder prints a running record of the water level on a paper chart. A stilling well and enclosure are required for the proper operation. These devices are mechanical and require considerable maintenance. In addition, the chart records are tedious to read and do not permit simple, quick flow evaluation.

Data logging instrumentation equipment can be adapted to record a continuous flow record but this equipment is complex and exceeds continuous flow recording requirements.

SUMMARY OF THE INVENTION

In general, the present invention is concerned with a recording method and a recorder device that provides easy, low-cost, continuous readout and recording of flow volumes in open channel flow measurement operations upstream of flumes or weirs. The invention has broad application to thousands of water diversions which are currently being made without accurate flow measurement, and will permit the water manager, whether a governmental agency, irrigation district, private firm or individual farmer, to manage and conserve water.

In accordance with a first aspect of the invention, a continuous flow measurement recorder is provided for determining and displaying water flow in an open channel, the continuous flow measurement recorder comprising: a sensor for determining, using a measurement structure in the open channel, the pressure head of water flowing in the open channel and for producing a corresponding output signal; a central processing unit for receiving the output signal from said sensor, for calculating total water flow in the channel based on the output signal and for producing a total flow signal based on the calculated total water flow; a display device for receiving the total flow signal from said central processing unit and for displaying total flow based thereon; and a single housing for housing the sensor, central processing unit, and display device.

In an advantageous implementation, the sensor comprises an ultrasonic sensor and said measurement structure comprises a weir or flume.

The display device preferably comprises a liquid crystal display device.

The housing advantageously comprises a top portion and a bottom portion mechanically connected to the top portion. The housing preferably further comprises a downwardly depending member connected to the bottom portion of the housing, and the sensor is preferably received in said member.

The central processing unit preferably determines average pressure head in the channel over a predetermined period of time based on the output signal received from the sensor, and stores the average pressure head in memory and uses the stored pressure head to calculate total flow. Advantageously, the central processing unit stores, in memory, values for a constant coefficient, C, and an exponent, n, both based on the characteristics of the measurement structure used, and uses these values to convert said average pressure head into a value for the flow discharge rate, Q, using the equation: $Q = Ch_a^n$, where $h_a$ is equal to the average pressure head over said predetermined period of time. The central processing unit converts the flow discharge rate, Q, into a total flow value, $T_f$, using the equation: $T_f = T_i + Qt$, where t is equal to said predetermined period of time and $T_i$ is a previously determined value for total flow of the beginning of period t.

In accordance with a further aspect of the invention, a method is provided for determining and displaying the total water in an open channel, the method comprising: using a sensor to obtain a plurality of pressure head measurements for water flowing through a measurement structure in the open channel over a predetermined period of time; using a central processing unit to determine an average pressure head measurement for the open channel for said predetermined period of time and to convert the average head measurement into a value representing total flow in the channel; and using a liquid crystal display device housed in a common housing with the sensor and the central processing unit to display the total flow value.

Advantageously, the average head measurement is converted into a value representative of the flow rate and the incremental flow discharge rate value is summed so as to produce the total flow value. The average head measurement is converted into a value representative of the discharge rate Q, using the equation: $Q = Ch_a^n$, where $h_a$ is the average head measurement, and C is a constant coefficient, and n is an exponent, both based on the characteristics of the measuring structure used. Preferably, the discharge rate Q is converted into a value $T_f$ representative of total flow using the equation: $T_f = T_i + Qt$, where t is said predetermined period of time and $T_i$ is a previously determined value for total flow at the beginning of the time period t.

Further features and advantages of the present invention will be set forth in, or apparent from, the detailed description of preferred embodiments thereof which follows.

BRIEF DESCRIPTION OF THE DRAWINGS

FIG. 3 is a side view of the preferred embodiment of the continuous flow measurement system of the invention, showing the common housing; and FIG. 4 is a transverse cross-sectional view of the embodiment of FIG. 2.

DESCRIPTION OF THE PREFERRED EMBODIMENTS

Referring to FIGS. 1 to 4, there is shown a continuous flow measurement system in accordance with a preferred embodiment of the invention. The measurement system, which is generally denoted 10, includes a display device 12, a central processing unit (CPU) 14, and a water-level sensor 16 housed within a housing unit 18.

Figure 1:
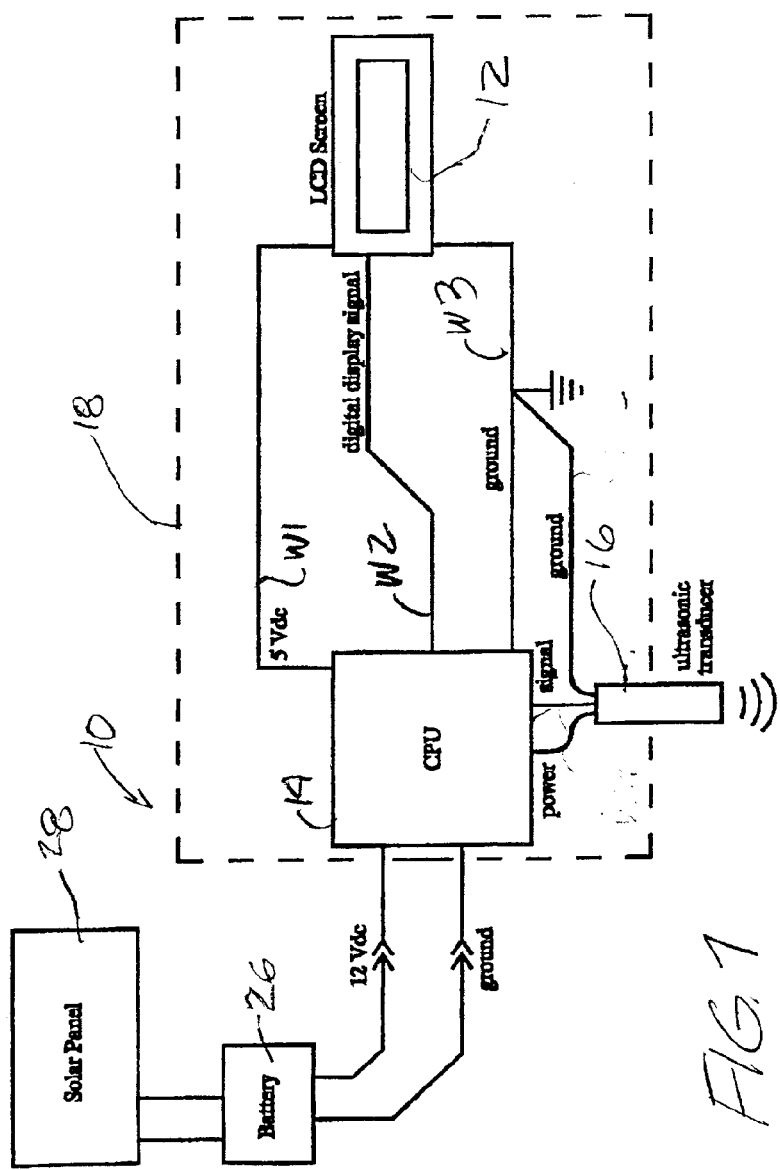
FIG. 1 is a schematic diagram of a preferred embodiment of the overall continuous flow measurement system of the invention, including block diagram and schematic circuit diagram representations of the basic units or elements thereof.
Figure 2:
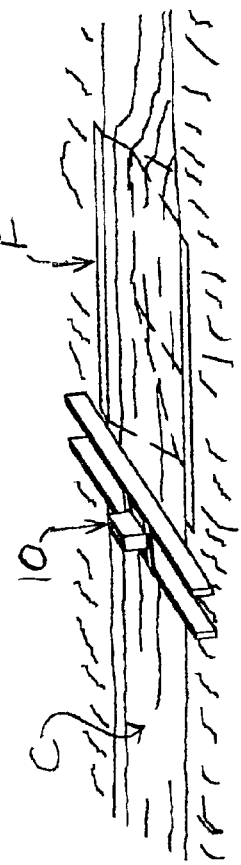
FIG. 2 is a perspective view of a preferred embodiment of the overall flow measurement system of the invention, showing the system in use.

The water-level sensor 16, the CPU 14, and the display device 12 cooperate to measure, calculate and display the total water flow. In general, as shown in FIG. 2, the device 10 (including the water-level sensor 16) is positioned relative to a measurement structure such as a flume or weir, indicated schematically at F, so as to measure the open channel head, $h_a$, of a channel indicated at C, and the output of the water-level sensor 16 is connected to the CPU 14 which uses measurements from the water-level sensor 16 to determine the total flow, $T_f$. The CPU 14 is connected to the display device 12 and transmits total flow, $T_f$, measurements for display by device 12.

As can be seen in FIGS. 3 and 4, the housing unit 18 provides a mounting for the display device 12, the CPU 14, and the water-level sensor 16 and because of the compact nature of the housing 18 the device 10 can be readily transported and installed.

In a preferred embodiment, as shown in FIGS. 3 and 4, the housing 18 is of a two piece or two component construction, comprising top or cover 18a and bottom or base portion 18b. The housing components, 18a and 18b, are connected together by conventional mechanical fastening indicated at 18c.

The CPU 14 stores head measurements and total flow measurements in memory along with discharge coefficients, C, and exponents, n, described below, used in stored equations that are used to calculate the total flow.

As shown in FIGS. 3 and 4, the water-level sensor 16 is mounted in a downwardly depending member 20 which forms part of housing 18 and which is secured to the bottom of the base portion 18b of housing 18 by a screw threaded mounting element 22. The water-level sensor 16 comprises an ultrasonic sensor, although other suitable level sensors can be used in some applications.

Display device 12 preferably comprises a liquid crystal display and is mounted at the top of housing 18 for convenient viewing in the example embodiment shown in FIGS. 3 and 4. A viewing window 24 protects the LCD 12. CPU 14 is connected to LCD 12 through three wires or connectors W1, W2 and W3. Wire W1 is for power (5 Vdc), wire W2 carries the digital display signal and wire W3 is connected to ground.

A power source in the form of a battery 26 and solar panel 28 provides DC supply voltage for CPU 14, although a different DC power source can be used.

The system 10 is particularly useful in agricultural applications to determine the total flow of water through an open channel C, as measured by a flume indicated at F in FIG. 2, where the typical units for total flow are acre/ft. The system 10, of course, can also be used to determine total flow in other units. The system 10 determines the total flow according to the equations:

$$Q = C h_a^n \quad \text{(eq. 1)}$$

where:
Q=discharge (ft³/s)
C=coefficient for the particular measuring structure
$h_a$=measuring head on the flume or weir
n=exponent value for the particular measuring structure
and $$T_f = T_i + Qt/43560 \quad \text{(eq. 2)}$$

where:
$T_f$=total flow (acre/ft.)
$T_i$=total flow (acre/ft.) determined previous
Q=discharge
t=time (s)

In operation, the ultrasonic water-level sensor 16 continuously measures the head, $h_a$, on the flume or weir F, and supplies these measurements to the CPU 14. The CPU 14 stores measurements over a predetermined period of time in order to determine the average pressure head over that period. The CPU 14 converts the average pressure head into a value for flow discharge Q, using equation 1, and into a total flow value, using equation 2. The CPU 14 supplies the values to the display device 12 for display thereby.

It should be noted that total flow can, of course, be computed in other units besides acre feet, but that acre feet is commonly used by irrigators. As equation 2 indicates, the total flow is summed each time the flow rate is calculated. In order to accomplish this, the CPU 14 must record and use the time interval between the last flow rate measurement and the present flow rate measurement. Considering a specific, non-limiting example calculation for a flume with a "C" value of 3.359, an "n" value of 1.57, a "$h_a$" of 1.24 ft., a previous measured total flow of 2.34 acre feet, and a time interval of 600 s, the calculated values for Q and $T_f$ are $$Q = 3.359(1.24^{1.57}) = 4.71 \text{ ft}^3/\text{s}$$

$$T_f = 2.34 + (4.71(600))/43560 = 2.40 \text{ acre feet.}$$

Although the invention has been described above in relation to preferred embodiments thereof, it will be understood by those skilled in the art that variations and modifications can be effected in these preferred embodiments without departing from the scope and spirit of the invention.

What is claimed is:

1. A continuous flow measurement recorder for determining and displaying water flow in an open channel, said continuous flow measurement recorder comprising:

a sensor for determining, using a measurement structure comprising a weir or flume displayed in the open channel, the pressure head of water flowing in the open channel and for producing a corresponding output signal;

a central processing unit for receiving said output signal from said sensor, for calculating total water flow in the channel based on said output signal and for producing a total flow signal based on the calculated total water flow;

a display device for receiving said total flow signal from said central processing unit and for displaying total flow based thereon; and a single housing for housing said sensor, said central processing unit, and said display device, said housing comprises a top portion, a bottom portion mechanically connected to the top portion, and a downwardly depending member connected to said bottom portion of said housing, and said sensor being received in said downwardly depending member and said top portion including a window in an upper region thereof through which said display device can be viewed.

2. The continuous flow measurement recorder of claim 1 wherein said sensor comprises an ultrasonic sensor.

3. The continuous flow measurement recorder of claim 1 wherein said display device comprises a liquid crystal display device.

4. The continuous flow measurement recorder of claim 1 wherein said central processing unit determines average pressure head in the channel over a predetermined period of time based on said output signal received from said sensor, stores said average pressure head in memory and uses said stored pressure head to calculate total flow.

5. The continuous flow measurement recorder of claim 4 wherein said central processing unit stores, in memory, values for a coefficient, C, and an exponent, n, both based on the characteristics of the measurement structure used and uses said values to convert said average pressure head into a value for the flow discharge rate, Q, using the equation;

$$Q = C h_a^n$$

where $h_a$ is equal to the average pressure head over said predetermined period of time.

6. A continuous flow measurement recorder for determining and displaying water flow in an open channel, said continuous flow measurement recorder comprising:

an ultrasonic sensor for determining, using a weir or flume measurement structure in the open channel, the pressure head of water flowing in the open channel and for producing a corresponding output signal;

a central processing unit for receiving said output signal from said sensor, for calculating total water flow in the channel based on said output signal and for producing a total flow signal based on the calculated total water flow;

a display device for receiving said total flow signal from said central processing unit and for displaying total flow based thereon; and a single housing for housing said sensor, said central processing unit, and said display device, said housing comprising a top portion, a bottom portion mechanically connected to the top portion so that the top portion can be separated from the bottom portion, and a downwardly depending member connected to said bottom portion of said housing, said sensor being received in said downwardly depending member, and said top position including a window in an upper region thereof through which said display device can be viewed, said central processing unit determining average pressure head in the channel over a predetermined period of time based on said output signal received from said sensor, storing said average pressure head in memory and using said stored pressure head to calculate total flow, said central processing unit further having stored therein, in memory, values for a coefficient, C, and an exponent, n, both based on the characteristics of the measurement structure used and uses and said central processing unit using said values to convert said average pressure head into a value for the flow discharge rate, Q, using the equation;

$$Q = C h_a^n$$

where $h_a$ is equal to the average pressure head over said predetermined period of time, and said central processing unit converting the flow discharge rate, Q, into a total flow value, $T_f$, using the equation:

$$T_f = T_i + Qt$$

where t is equal to said predetermined period of time and $T_i$ is a previously determined value for total flow of the beginning of period t.

7. A continuous flow measurement recorder for determining and displaying water flow in an open channel, said continuous flow measurement recorder comprising:

a sensor for determining, using a measurement structure in the open channel, the pressure head of water flowing in the open channel and for producing a corresponding output signal;

a central processing unit for receiving said output signal from said sensor, for calculating total water flow in the channel based on said output signal and for producing a total flow signal based on the calculated total water flow;

a display device for receiving said total flow signal from said central processing unit and for displaying total flow based thereon; and a single housing for housing said sensor, said central processing unit, and said display device, said housing comprises a top portion, a bottom portion mechanically connected to the top portion, and a downwardly depending member connected to said bottom portion of said housing, and said sensor being received in said downwardly depending member;

wherein said central processing unit determines average pressure head in the channel over a predetermined period of time based on said output signal received from said sensor, stores said average pressure head in memory and uses said stored pressure head to calculate total flow; and wherein said central processing unit stores, in memory, values for a coefficient, C, and an exponent, n, both based on the characteristics of the measurement structure used and uses said values to convert said average pressure head into a value for the flow discharge rate, Q, using the equation;

$$Q = C h_a^n$$

where $h_a$ is equal to the average pressure head over said predetermined period of time.

8. The continuous flow measurement recorder of claim 7 wherein said central processing unit converts the flow discharge rate, Q, into a total flow value, $T_f$, using the equation:

$$T_f = T_i + Qt$$

where t is equal to said predetermined period of time and $T_i$ is a previously determined value for total flow of the beginning of period t.

* * * * *